O. G. RIESKE.
DISK ATTACHMENT FOR DRILLS.
APPLICATION FILED OCT. 28, 1909.

1,046,221.

Patented Dec. 3, 1912.

2 SHEETS—SHEET 1.

Witnesses
A. H. Opsahl
H. D. Kilgore

Inventor
Otto George Rieske
By his Attorneys
Williamson Merchant

O. G. RIESKE.
DISK ATTACHMENT FOR DRILLS.
APPLICATION FILED OCT. 28, 1909.
1,046,221.
Patented Dec. 3, 1912.
2 SHEETS—SHEET 2.
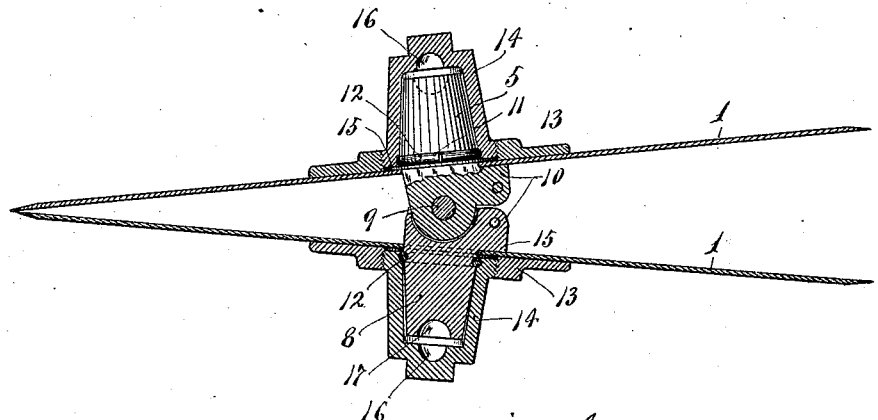
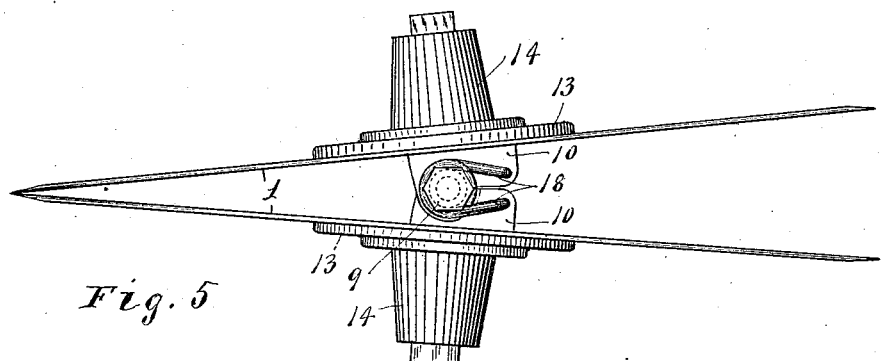
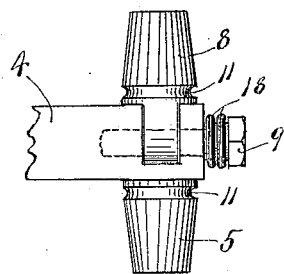
Witnesses.
A. H. Opsahl.
H. D. Nilson.
Inventor.
Otto George Rieske
By his Attorneys
Williamson & Merchant

UNITED STATES PATENT OFFICE.

OTTO GEORGE RIESKE, OF ST. LOUIS PARK, MINNESOTA, ASSIGNOR, BY DIRECT AND MESNE ASSIGNMENTS, TO MONITOR DRILL COMPANY, OF ST. LOUIS PARK, MINNESOTA, A CORPORATION OF MINNESOTA.

DISK ATTACHMENT FOR DRILLS.

1,046,221.  Specification of Letters Patent.  Patented Dec. 3, 1912.

Application filed October 28, 1909. Serial No. 525,018.

*To all whom it may concern:*

Be it known that I, OTTO GEORGE RIESKE, a citizen of the United States, residing at St. Louis Park, in the county of Hennepin and State of Minnesota, have invented certain new and useful Improvements in Disk Attachments for Drills; and I do hereby declare the following to be a full, clear, and exact description of the invention, such as will enable others skilled in the art to which it appertains to make and use the same.

My invention has for its object to provide an improved disk attachment for drills or seeding machines and, to this end, it consists of the novel devices and combinations of devices hereinafter described and defined in the claims.

My invention provides means for adjusting the disks so as to maintain engagement between their converging edges and to compensate for irregularities in the disk surfaces and for diminution in the size of the disks due to wear. This may be accomplished by providing a seed boot with trunnions, at least one of which is movable in respect to the other, and in combining therewith a yielding tension device which will serve to automatically maintain the engagement between the converging edges of the disks.

The present application also discloses improved means for detachably journaling the disks on coöperating trunnions, but this construction is the subject matter of my companion application filed as a division of the present application, of date Dec. 27, 1909, under S. N. 534,966, and entitled "Disk journals."

In the accompanying drawings which illustrate the invention, like characters indicate like parts throughout the several views.

Figure 1:
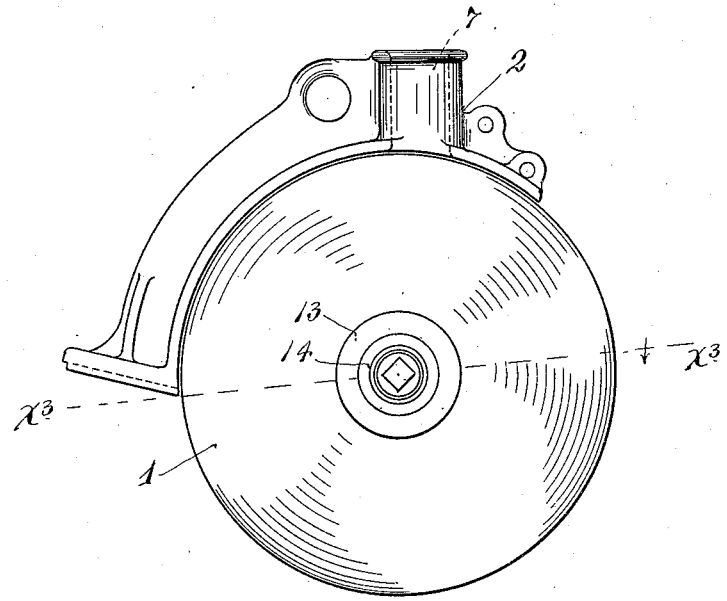
Figure 2:
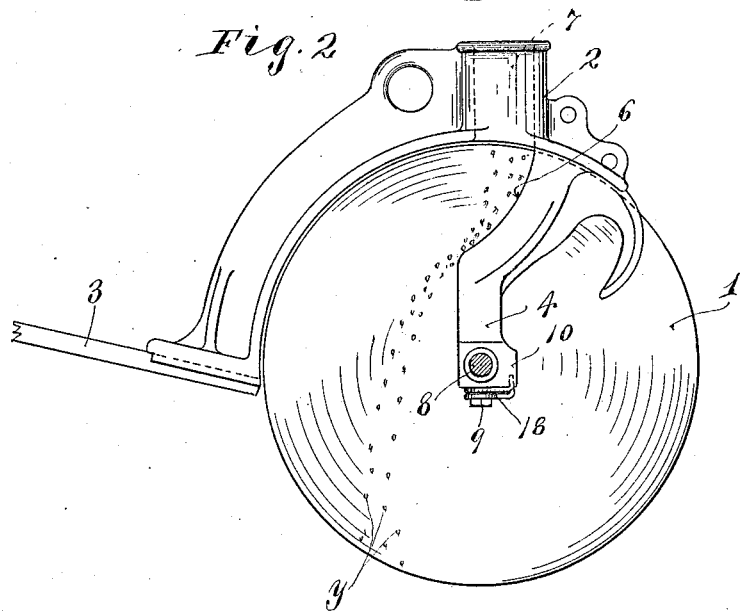

Referring to the drawings, Figure 1 is a side elevation showing the so-called double disk attachment embodying the features of my invention; Fig. 2 is a view corresponding to Fig. 1, but with one of the disks removed and with one of the trunnions sectioned; Fig. 3 is a horizontal section taken on the line $x^3\ x^3$ of Fig. 1; Fig. 4 is a bottom plan view of the device; Fig. 5 is a detail showing a portion of the boot leg and the relatively fixed and pivoted trunnions thereof; and Fig. 6 is a detail view in elevation, showing one of the sectional journal locking rings removed from working position.

The disks are indicated by the numeral 1 and the seed boot is indicated as an entirety by the numeral 2. This seed boot is provided with the customary forwardly and downwardly curved arm, to which a coöperating drag bar 3 is secured in the usual or any suitable way. The spout of the seed boot, in this preferred construction, is made short and is provided with a heavy depending leg 4, having on one side a rigid outwardly projecting trunnion 5. The upper portion of the leg 4 is made approximately as wide as the distance between the upper diverging portions of the two disks, and on its front edge, has a downwardly and forwardly extended incline 6, the upper portion of which joins the rear portion of the vertical passage 7 of the seed boot, into which passage, the customary grain spout, not shown, will be inserted. The purpose of this incline 6 will be further considered later on.

A pivotally movable trunnion 8 is pivotally connected to the lower end of the boot leg 4, with its axis approximately in the horizontal plane of the fixed trunnion 5, by a vertically extended bolt 9, passed through interlapping locks on the said movable trunnion and on the lower end of said leg 4. The two trunnions 5 and 8 are preferably both tapered and of the same diameter, and they are formed with coöperating stop lugs 10, and just outward of said stop lugs, with annular grooves 11, in which sectional (preferably two-part) lock rings 12 are half embedded, when the disks are secured in working position on the said trunnions.

The disks are provided with axial perforations, adapting them to be placed upon the trunnions in close engagement with the stop lugs 10, and just inside of the lock grooves 11. Also each disk is provided, on its outer face, with rigidly secured annular screw plates 13, having internal threads for engagement with the threaded inner extremities of journal caps 14. At their inner extremities, the journal caps 14 are formed with grooves adapting them to receive the outer portions of lock rings 12. Washers 15, which closely fit the inner portions of the trunnions, are preferably clamped between the inner ends of the journal caps 14 and the adjacent portions of the disks. The inner edges of these washers 15 engage directly with the lock rings 12 and relieve the disks from wear. These washers, as is evident, when worn, may be very quickly replaced simply by removing the journal caps and lock rings. Also this repair may be made at trifling cost, whereas if the wear were to be taken directly with the disk, the repair would be a matter of much difficulty and expense. Furthermore, the journal caps themselves, when worn, may be easily and cheaply replaced. Since there will be considerable wear also on the trunnions, the journal caps used for repairs may be made somewhat smaller than those originally used. The lock rings, when secured in working position, as above described, permit free rotations of the disks on the trunnions by holding the said disks against lateral movements of the trunnions, and this is so whether the trunnions be straight or tapered.

To adapt the journal caps to hold hard oil or grease without making the same unnecessarily long, they are shown as provided, in their outer end portions, with cavities 16, and the trunnions are shown as provided with end cavities 17.

Normally, or before the disks have been worn, the stop lugs 10 of the coöperating trunnions are in engagement with, and hold the trunnions at such an angle to each other that the converging edges of the two disks are substantially together.

As means for maintaining the contact between the converging edges of the disks, regardless of irregularities in the disks, and to compensate for wear of the disks, I employ a spring or yielding tension device, and this device is preferably in the form of a strong coiled torsion spring 18, applied to the depending end of the pivot bolt 9, and provided with arms anchored to the lugs 10 of the trunnions, as best shown in Figs. 4 and 5. This spring, as is evident, will keep the converging edges of the disks engaged, even when the disks are worn down to a very much less diameter, (approximately three inches less), than the original diameter and, hence, all wear is thereby automatically taken up or compensated for. The fact, that the spring will keep the converging edges of the disks engaged, regardless of irregularities in the disks, is very important because it makes unnecessary an expensive process of straightening the disks.

Returning now to the construction of the inclined surface 6 on the leg 4 of the seed boot, it will be noted that the lower extremity thereof terminates vertically over the projecting axes of the disks and that the passage of the said seed boot is located at the rear of this vertical line. With this arrangement, the seeds (indicated by the character y in Fig. 2) are delivered between the disks at a point at the rear of a line drawn through the projecting axes of the disks and fall upon the forwardly and downwardly inclined deflecting surface 6 and are thereby given a forward impulse or deflection so that the seeds will fall between the downwardly moving extended portions of the disks and, hence, will be deposited in the furrow while the furrow is held open by the disks and before any dirt has had a chance to fall back into the furrow.

The term double disk attachment is herein used in a broad sense to include any plural arrangement of disks for opening a furrow in connection with seeding machines or other machines employing such disks.

The threaded engagements between the journal caps 14 and the screw plates 13, are one right hand and the other left hand, and in such direction that the caps will be tightened instead of loosened under rotation of the disks.

What I claim is:

1. A double disk attachment comprising coöperating converging disks mounted for rotation and having their edges in contact, at least one of which disks is angularly movable with respect to the other about a point in line with or behind the center of rotation of the disks, to thereby compensate for diminution of the size of the disks due to wear.

2. A double disk attachment comprising coöperating converging disks mounted for rotation and having their edges in contact, at least one of which disks is angularly movable with respect to the other about a point in line with or behind the center of rotation of the disks, the said movable disk always maintaining a tangent to a constant imaginary circle between the disks, to thereby compensate for diminution of the size of the disks due to wear.

3. A double disk attachment having coöperating converging disks mounted on journals and set with their edges in contact, one of which journals is movable in respect to the other, and a yielding tension device reacting on said journals, to maintain engagement betweeen the converging edges of said disks.

4. A double disk attachment having pivotally connected trunnions and converging disks journaled thereon and set with their edges in contact, in combination with a yielding tension device reacting on said trunnions, to maintain engagement between the converging edges of said disks.

5. A double disk attachment comprising a seed boot with a depending leg, provided with a fixed trunnion and with a pivotally connected trunnion, disks on the trunnions set with their edges in contact, and a spring reacting on said trunnions, to maintain engagement between the converging edges of said disks.

6. A double disk attachment comprising a seed boot having a depending leg formed with one rigid trunnion, and one pivotally movable trunnion, a vertical bolt pivotally connecting said movable trunnion to the said boot leg and fixed trunnion, a torsion spring applied to the lower end of said pivot bolt and reacting against said trunnions, and a pair of converging disks journaled on said trunnions and held in engagement at their converging edges by said spring.

7. A double disk attachment having coöperating converging disks set with their edges in contact and a yielding tension device acting to maintain the engagement between the converging edges of said disks to compensate for irregularities in their surfaces and for diminution in size due to wear.

8. A double disk attachment having coöperating converging disks set with their edges in contact, journals on which the disks are mounted, one of which is movable with respect to the other, and a yielding tension device adapted to maintain the engagement between the converging edges of the disks.

9. In a double disk attachment, the combination with a seed boot having a depending leg and a pair of converging disks journaled to said leg, to permit of rotation and bodily angular movement of the said disks the said leg being located between said disks and said seed boot having a seed delivery passage located at the rear of a vertical line drawn through the projecting axes of the disks and the said depending boot leg having on its extreme front face an exposed or uncovered forwardly inclined seed deflecting surface formed on an integral part of said leg and immediately underlying said seed delivery passage and adapted to deflect the seeds dropped thereon forward into the open space between the converging portions of the disks.

10. A double disk attachment having coöperating disks set with their edges in contact, one of which is yieldingly mounted for angular movements bodily in respect to the other to automatically maintain engagement between the converging edges of said disks, to thereby compensate for irregularities in the surfaces and for diminution in the size due to wear.

11. A double disk attachment having coöperating converging disks mounted for rotation and set in contact at their front edges, and diverging journals on which said disks are mounted and which journals are connected together by a jointed connection located in line with or behind the center of disk rotation, whereby said disks are angularly movable bodily to maintain engagement at their converging front edges.

12. A double disk attachment comprising a seed boot with a depending leg, provided with a fixed trunnion and with a pivotally connected trunnion, and disks rotatably mounted on the said trunnions, and set with their edges in contact, whereby one of said disks can move bodily to maintain engagement between their converging edges.

13. A double disk attachment comprising a seed boot having a depending leg formed with one rigid trunnion, a pivotally movable trunnion mounted on the rigid trunnion, a vertical bolt for effecting a pivotal connection between both of said trunnions, and a pair of converging disks journaled on said trunnions.

14. A double disk attachment comprising coöperating converging disks mounted for rotation and for free angular movement with respect to each other, and having their edges in contact, whereby at least one disk is free to move angularly to compensate for diminution of the size of the disks due to wear.

In testimony whereof I affix my signature in presence of two witnesses.

OTTO GEORGE RIESKE.

Witnesses:
 HARRY D. KILGORE,
 F. D. MERCHANT.

---

Copies of this patent may be obtained for five cents each, by addressing the "Commissioner of Patents, Washington, D. C."